United States Patent [19]

Yu

[11] 4,080,402

[45] Mar. 21, 1978

[54] POLYMERS OF BENZENE PHOSPHORUS OXYDICHLORIDE AND 4,4'-THIODIPHENOL

[75] Inventor: Arthur J. Yu, Stamford, Conn.

[73] Assignee: Stauffer Chemical Company, Westport, Conn.

[21] Appl. No.: 613,146

[22] Filed: Sep. 15, 1975

[51] Int. Cl.$^2$ .................. C08L 67/02; C08L 85/02
[52] U.S. Cl. .............................. 260/860; 260/79; 260/47 P; 260/2 P
[58] Field of Search ............... 260/47 P, 860, 79.7, 260/79

[56] References Cited

U.S. PATENT DOCUMENTS 3,719,727  3/1973  Masai et al. .................. 260/49

OTHER PUBLICATIONS

Kovarskaya et al.; *Chemical Abstracts*, vol. 73 (1970), 26274z, "Stabilization of Polycarbonates."
Kirpichnikov et al.; Chemical Abstracts, vol. 75 (1971), 152489c, "Protection of Polymers by Phosphorous Acid Esters . . ."

*Primary Examiner*—Wilbert J. Briggs, Sr.
*Attorney, Agent, or Firm*—Richard P. Fennelly

[57] ABSTRACT

Flame retardant polymers of benzene phosphorus oxydichloride and 4,4'-thiodiphenol are disclosed which are preferably formed by reacting these monomers in an inert organic solvent at ambient temperature in the presence of an amine acid acceptor. Also disclosed are polyester compositions containing such polymers as a flame retardant additive.

7 Claims, No Drawings

POLYMERS OF BENZENE PHOSPHORUS OXYDICHLORIDE AND 4,4'-THIODIPHENOL

TECHNICAL DESCRIPTION OF THE INVENTION

The present invention relates to polymers of resinous, polymeric phosphonates having improved flame retardant properties and polyester compositions containing said polymers.

In U.S. Pat. No. 2,743,258 to H. M. Coover, Jr. it was proposed that resinous polyphosphonates having the recurring structural formula

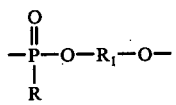

be formed, where R was a $C_1-C_{12}$ alkyl group, or an aryl group, and $R_1$ was an aromatic nucleus. That patent suggested reacting benzene phsophonyl dichloride with a number of dihydroxyphenols, such as dihydroxydiphenylsulfones. The Coover Jr. patent mentioned that the products produced by such a reaction were useful as materials for the preparation of fibers, films, coating and molding compositions, and the like.

More recently, U.S. Pat. No. 3,719,727 has issued to Y. Masai et al., and this patent relates to the specific use of polyaryl phosphonates formed from a sulfone diol, such as 4,4'-dihydroxydiphenyl sulfone, and a phosphorus-containing compound, such as phenyldichlorophosphine oxide, which is also named benzene phosphorus oxydichloride. The resulting polymer is taught as being useful as a flame retardant additive in a polyester composition. That recent patent clearly teaches that a polyaryl phosphonate having a sulfonyl group in its molecular chain is a better flameproofing additive than one which does not contain a sulfonyl group.

It has now unexpectedly been found that, whereas the glass transition temperature ($T_g$) of a polyphenyl phosphonate made from benzene phosphorus oxydichloride and 4,4'-bis hydroxyphenyl sulfone is 146° C., the glass transition temperature of a polyphenyl phosphate made from benzene phosphorus oxydichloride and 4,4'-thiodiphenol is 83° C.

The glass transition temperature is a measure of a a polymer's brittleness and stiffness with a higher value indicating a more brittle value. Since the $T_g$ of polyethylene terephthalate is 69° C. the thiodiphenol-containing polymer has a much less detrimental effect on the stiffness of the polyester fiber and on the softness and suppleness of the fabric containing such fibers than if a bis-hydroxyphenyl-sulfone containing polymer is used to make the flame retardant additive.

It has also been unexpectedly found that flame retardant copolymers formed by reacting benzene phosphorus oxydichloride and 4,4'-thiodiphenol have a flame retardancy which is superior to that exhibited by copolymers of benzene phosphorus oxydichloride and 4,4'-sulfonyldiphenol. It has furthermore been unexpectedly found that a polyester composition containing such a polymer has equal or slightly better flame retardancy than one containing the type of polymer described in U.S. Pat. No. 3,719,727. The flame retardant copolymers of this invention also have utility as an engineering thermoplastic which is suitable for use in conventional injection molding apparatus.

The molar ratio of benzene phosphorus oxydichloride and 4,4'-thiodiphenol which are reacted together to form the copolymers of the present invention can range anywhere from about 0.7:1 to 1:0.7. It is preferred, however, to use equimolar amounts.

A number of processes can be used to make the copolymers of the present invention. For example, any of the above described molar amounts of the two reactants can be reacted in the absence of either solvent or catalyst at elevated temperatures of from about 120° C. to about 250° C. until a homogeneous, viscous melt is produced. This reaction has the disadvantage that it is quite slow, taking several days to complete, and yields a product which may be of a dark color, which is unsuitable in some applications. In variably, hydrogen chloride, a by-product of this reaction, is trapped in such a viscous melt and cannot be easily removed. The presence of hydrogen chloride will adversely affect the hydrolytic stability of the product causing rapid chain degradation.

Another procedure which can be used is the same general reaction sequence which is described in U.S. Pat. No. 2,743,258 to H. W. Coover, Jr. In this procedure, the monomers, as described above, are reacted in the presence of from about 0.1% to about 3%, by weight of a suitable anhydrous alkaline earth halide condensation catalyst, e.g., anhydrous magnesium chloride, at a temperature of from about 90° C. to about 400° C., preferably about 150° C. to about 260° C. If desired, this reaction can be carried out in a suitable inert solvent.

The procedure which is preferred for purposes of the present invention is the reaction of the above monomers in the above-described molar amounts at much lower temperatures, e.g., from about 0° C. to about 50° C. in solution and in the presence of an amount of amine acid acceptor which is sufficient to scavenge the hydrochloric acid by-product which is produced by the reaction of the monomers. Generally, a molar amount of amine acid acceptor which ranges from about 2:1 to 3:1, based on the molar amount of the reacting monomers, is sufficient. The solvent which is to be used is preferably an inert organic solvent, most preferably a chlorinated hydrocarbon solvent, which will not interfere with the reaction and in which the intermediates and product are soluble. Suitable solvents include methylene chloride, carbon tetrachloride, dichloroethane and the like.

The amine acid acceptor can be any of the $C_1-C_8$ trialkyl or branched dialkyl monoamines or the heterocyclic amines. Preferred acid acceptors are the $C_1-C_8$ trialkylamines. Some representative amines are triethylamine, pyridine, diisopropylamine and the like.

The copolymer of the present invention has a melting point of about 155° C. and a relative viscosity, at 25° C. as a 1% by weight concentration of the polymer in trichloroethylene, of from about 1.25 to about 2.9.

A preferred use for the copolymer of the present invention is as a flame retardant additive in a polyester composition.

The types of polyester with which the copolymer of the present invention finds use are those well-known, normally flammable polyesters, including polybutylene terephthalate, polyethylene terephthalate, poly-1,4-cyclohexane methylene terephthalate, polyethylene sebacate, polyethylene adipate, and the like, as well as copolyesters thereof.

The amount of the copolymer which is added should be an effective amount for the degree of flame retardancy required. Generally, from about 5% to about 25%, preferably from about 10% to about 15%, by weight of the polyester composition, of the copolymer is used. The degree of flame retardancy is generally determined by the amount of phosphorus in the flame retarded polyester composition. An effective range is from about 0.1% to about 2.3%, by weight, phosphorus in the polyester composition.

The same methods described in U.S. Pat. No. 3,719,727 to Masai et al. for incorporation of the sulfonyl containing copolymer additives described therein in a polyester composition can be used in forming the polyester compositions of the present invention. Preferably, the copolymer is incorporated in the polyester under molten conditions and the mixture is used to make either pellets or fibers utilizing techniques well known to persons of ordinary skill in the art.

These and other embodiments of the claimed invention are illustrated by the Examples which follow:

EXAMPLE 1

This Example illustrates the formation of a copolymer of benzene phosphorus oxydichloride and 4,4'-thiodiphenol according to a preferred procedure. A three neck flask with a mechanical stirrer, an addition funnel and condenser were used.

the following reagents were charged into the flask:

| Reagent | Amount | |
| --- | --- | --- |
| 4,4'-thiodiphenol | 21.8 g. | (0.1 mole) |
| Triethylamine | 22.2 g. | (0.22 mole) |
| Methylene Chloride | 120 ml. | |

The following reagents were placed in the addition funnel:

| Reagent | Amount | |
| --- | --- | --- |
| Benzene phosphorus oxydichloride | 19.5 g. | (0.10 mole) |
| Methylene chloride | 30 ml. | |

The benzene phosphorus oxydichloride was slowly added to the flask over a period of 20–30 minutes with rapid stirring at room temperature. The stirring was continued for one hour after the addition had been completed, and the resulting solution was washed with a 1.2 N equal volume of hydrochloric acid and an equal volume of distilled water. The solution was added to methanol to yield the desired product as a powdery precipitate. The precipitate was removed from solution and was vacuum dried. The weight of polymer was 29.2 g., and it had a relative viscosity, as a 1% by weight solution in trichloroethylene at 25° C., of 2.89. The inherent viscosity was 1.06, and the intrinsic viscosity was 123.

EXAMPLE 2

This Example illustrates the preparation of benzene phsophorus oxydichloride and 4,4'-thiodiphenol and, for comparative testing, a polymer of benzene phosphorus oxydichloride and 4,4'-sulfonyldiphenol, as taught by U.S. Pat. No. 2,743,258 to H. W. Coover, Jr. The same procedure used in Example 1 was utilized in this Example.

The benzene phosphorus oxydichloride-4,4'-thiodiphenol copolymer (hereinafter abbreviated "BPOD/TDP") was formed from the following:

48.75 g. (0.25 mole) benzene phosphorus oxydichloride in 100 ml. of methylene chloride;

54.5 g. (0.25 mole) 4,4'-thiodiphenol and 55.5 g. (0.55 mole) triethylamine, both dissolved in 400 ml. of methylene chloride.

The benzene phosphorus oxydichloride-4,4'-sulfonyldiphenol copolymer (hereinafter abbreviated "BPOD/SDP") was formed from the following:

48.75 g. (0.125 mole) benzene phosphorus oxydichloride in 100 ml. methylene chloride;

62.5 g (0.25 mole) 4,4'-sulfonyl diphenol and 55.5 g. (0.55 mole) triethylamine, both dissolved in 400 ml. of methylene chloride.

All the reagents that were used had either been dried or distilled.

The following results were obtained using standard test procedures. The numeral "1" refers to the BPOD/TDP product of the present invention, and the number "2," the BPOD/SDP product which is shown in the Coover Jr. U.S. Patent.

| | 1 | 2 |
| --- | --- | --- |
| Relative Viscosity | 1.50 | 1.32 |
| Yield | 94% | 95% |
| Melting Point | 155° C. | 190° C. |
| Tg | 83° C. | 146° C. |
| Phosphorus Content (by weight) | 9.15% | 8.35% |

The respective polymers were also tested for flammability using the Limiting Oxygen Index (LOI) ASTM D-2863 test which is described by Fenimore and Martin in the November, 1966 issue of Modern Plastics. The LOI method directly relates to the minimum percentage concentration of oxygen in an oxygen-nitrogen mixture which permits the sample to burn: A higher LOI is indicative of a higher degree of flame retardancy. The following LOI values were observed and demonstrate the greater flame retardancy for the product of the present invention, namely, No. 1, listed below:

| | 1 | 2 |
| --- | --- | --- |
| LOI | 65 | 52 |

EXAMPLE 3

This Example shows the favorable flame retardancy of a polyester composition of the present invention as compared to one formed in accordance with U.S. Pat. No. 3,719,727 to Masai et al. which contains a copolymer having a sulfonyl group in its molecular chain.

Samples of compositions containing 93%, by weight, of a commercial polybutylene terephthalate (Valox 310, General Electric Products Dept.) and 7%, by weight, of the two products shown in Example 2 were prepared. The procedure involved melting each of the respective polymers and polyester in separate oil baths at 290° C. under nitrogen, mixing the respective polymer and polyester and then drawing the mixture with a ¼ inch diameter glass rod through a Teflon fluorocarbon tube.

The polyester-BPOD/TDP composition of this invention and the polyester-BPOD/SDP composition of U.S. Pat. No. 3,719,727 of Masai et al. were each tested using the Limiting Oxygen Index (LOI) ASTM D-2863 test which is described by Fenimore and Martin in the November, 1966 issue of Modern Plastics. The LOI method directly relates to the minimum percentage concentration of oxygen in an oxygen-nitrogen mixture which permits the sample to burn. A higher LOI is indicative of a higher degree of flame retardancy. The following LOI values and melting points were observed:

|  | LOI | % P | M.P. (° C.) |
|---|---|---|---|
| Polyester (Valox 310) alone | 24.6 | 0 | 232 |
| Polyester -BPOD/TDP | 30 | 0.64 | 220 |
| Polyester -BPOD/SDP | 27.4 | 0.58 | 220 |

Unexpectedly, in view of the teachings of U.S. Pat. No. 3,719,727, to polyester —BPOD/TDP composition exhibited a slightly higher LOI, which is indicative of a slightly better flame retardance, than a sulfonyl group containing polyphosphonate.

The preceding Examples are merely illustrative of a certain preferred embodiment of the invention. The scope of protection which is sought is given in the claims which follow.

What is claimed is:

1. A polyester composition containing an effective amount for flame retardancy of a copolymer of benzene phosphorus oxydichloride and 4,4'-thiodiphenol.

2. A composition as claimed in claim 1 wherein the polyester is selected from the group consisting of polybutylene terephthalate, polyethylene terephthalate, poly-1,4-cyclohexane methylene terephthalate, polyethylene sebacate and polyethylene adipate.

3. The composition of claim 1 wherein the amount of copolymer is from about 5% to about 25% by weight of the polyester composition.

4. The composition of claim 1 wherein the amount of copolymer is from about 10% to about 15% by weight of the polyester composition.

5. A composition as claimed in claim 1 wherein the copolymer has a relative viscosity of about 1.25 to about 2.9 as measured by a 1% by weight concentration of the copolymer in trichloroethylene at 25° C.

6. A composition as claimed in claim 1 wherein the copolymer has a melting point of about 155° C.

7. A composition as claimed in claim 1 wherein the copolymer is present at from about 10% to about 15% by weight of the composition and has a relative viscosity of about 1.25 to about 2.9 as measured by a 1% by weight concentration of the copolymer in trichloroethylene at 25° C.

* * * * *